US012787023B2

(12) United States Patent
Lei

(10) Patent No.: US 12,787,023 B2
(45) Date of Patent: Nov. 3, 2026

(54) METHOD AND APPARATUS FOR HYBRID AUTOMATIC REPEAT REQUEST ACKNOWLEDGEMENT (HARQ-ACK) CODEBOOK DETERMINATION FOR MULTI-CARRIER SCHEDULING

(71) Applicant: LENOVO (BEIJING) LIMITED, Beijing (CN)

(72) Inventor: Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 375 days.

(21) Appl. No.: 18/040,932

(22) PCT Filed: Aug. 7, 2020

(86) PCT No.: PCT/CN2020/107682
§ 371 (c)(1),
(2) Date: Feb. 7, 2023

(87) PCT Pub. No.: WO2022/027551
PCT Pub. Date: Feb. 10, 2022

(65) Prior Publication Data
US 2023/0319843 A1 Oct. 5, 2023

(51) Int. Cl.
*H04W 72/232* (2023.01)
*H04L 1/1812* (2023.01)
*H04W 72/1273* (2023.01)

(52) U.S. Cl.
CPC ......... *H04W 72/232* (2023.01); *H04L 1/1812* (2013.01); *H04W 72/1273* (2013.01)

(58) Field of Classification Search
CPC ... H04L 1/1812; H04L 5/0044; H04L 5/0055; H04L 5/0091; H04W 72/1273; H04W 72/23; H04W 72/232
See application file for complete search history.

(56) References Cited

U.S. PATENT DOCUMENTS 10,070,478 B2 * 9/2018 He ........................ H04L 5/0091
10,341,057 B2 * 7/2019 Shen ......................... H04L 1/18
(Continued)

FOREIGN PATENT DOCUMENTS

CN 109699075 A 4/2019
CN 112740592 A * 4/2021 ........... H04L 1/1812
(Continued)

OTHER PUBLICATIONS

MODERATOROPPO. "Summary#1 on UCI enhancements for R16 URLLC" 3GPP TSG RAN WG1 #100b-e Meeting R1-2002695, Apr. 30, 2020, pp. 1-65.
(Continued)

*Primary Examiner* — Eric Nowlin
(74) *Attorney, Agent, or Firm* — AMPACC Law Group, PLLC

(57) ABSTRACT

Embodiments of the present disclosure relate to methods and apparatuses for HARQ-ACK codebook determination. According to some embodiments of the disclosure, a method for wireless communications performed by a UE may include: receiving a plurality of DCI formats for scheduling PDSCH transmissions on a plurality of serving cells, wherein each of the plurality of DCI formats include a first indication information and a second indication information related to HARQ-ACK information for a PDSCH transmission scheduled by a corresponding DCI format; receiving the PDSCH transmissions based on the plurality of DCI formats; generating a HARQ-ACK codebook based on the first indication information and the second indication information in the plurality of DCI formats; and transmitting the HARQ-ACK codebook.

20 Claims, 5 Drawing Sheets

(56) References Cited

U.S. PATENT DOCUMENTS 10,659,210 B2 * 5/2020 Ahn ........ H04L 1/0031
10,848,293 B2 * 11/2020 Ahn ........ H04L 1/0026
11,043,993 B2 * 6/2021 Yang ........ H04B 7/0456
11,121,824 B2 * 9/2021 Papasakellariou ... H04B 7/0413
11,349,614 B2 * 5/2022 Karaki ........ H04L 5/0055
11,844,075 B2 * 12/2023 Yoon ........ H04L 1/1812
11,902,032 B2 * 2/2024 El Hamss ........ H04L 1/1812
12,074,752 B2 * 8/2024 Wu ........ H04L 1/1861
12,199,780 B2 * 1/2025 Takeda ........ H04L 5/0094
12,206,509 B2 * 1/2025 El Hamss ........ H04L 5/0091
2014/0328260 A1 * 11/2014 Papasakellariou .... H04W 72/23 370/329
2016/0219557 A1 * 7/2016 He ........ H04L 5/0091
2017/0026997 A1 * 1/2017 Moulsley ........ H04L 1/18
2018/0241510 A1 * 8/2018 Shen ........ H04L 1/18
2019/0268123 A1 * 8/2019 Ahn ........ H04L 1/003
2019/0306878 A1 10/2019 Zhang
2020/0127771 A1 * 4/2020 Papasakellariou .... H04L 1/1812
2020/0127773 A1 * 4/2020 Papasakellariou .... H04L 1/1854
2020/0162224 A1 * 5/2020 Ahn ........ H04W 72/0446
2020/0344012 A1 * 10/2020 Karaki ........ H04L 1/1812
2020/0358487 A1 * 11/2020 Yang ........ H04L 1/1819
2021/0105750 A1 * 4/2021 Khoshnevisan ...... H04W 72/23
2021/0143945 A1 * 5/2021 Park ........ H04L 1/1896
2021/0328728 A1 * 10/2021 El Hamss ........ H04L 1/1864
2022/0217756 A1 * 7/2022 Wu ........ H04L 1/1861
2023/0029963 A1 * 2/2023 Yuan ........ H04L 5/0055
2023/0030642 A1 * 2/2023 Yuan ........ H04L 1/1822
2023/0083414 A1 * 3/2023 Takeda ........ H04L 1/1861 370/329
2023/0085896 A1 * 3/2023 Takeda ........ H04L 5/0044
2023/0113419 A1 * 4/2023 Yuan ........ H04L 1/1614 370/329
2023/0156701 A1 * 5/2023 Lei ........ H04L 1/1861 370/329
2023/0216614 A1 * 7/2023 Wang ........ H04L 1/1854 370/329
2023/0361924 A1 * 11/2023 Lei ........ H04L 1/1664
2024/0073894 A1 * 2/2024 Lei ........ H04L 1/1854
2024/0080142 A1 * 3/2024 El Hamss ........ H04L 1/1812
2025/0112738 A1 * 4/2025 El Hamss ........ H04L 5/0055

FOREIGN PATENT DOCUMENTS

CN 114982176 A * 8/2022 ........ H04L 1/1822
CN 115336211 A * 11/2022 ........ H04L 1/1614
CN 115336211 B * 6/2023 ........ H04L 1/1614
CN 114982176 B * 3/2024 ........ H04L 1/1822
CN 112740592 B * 7/2024 ........ H04L 1/1812
CN 118694492 A * 9/2024 ........ H04L 1/1812
CN 118740340 A * 10/2024 ........ H04L 1/1812
WO 2019212628 A1 11/2019
WO WO-2020033237 A1 * 2/2020 ........ H04L 1/1812
WO 2020141994 A1 7/2020
WO WO-2020235884 A1 * 11/2020 ........ H04L 1/1607
WO WO-2021142755 A1 * 7/2021 ........ H04L 1/1822
WO WO-2021196064 A1 * 10/2021 ........ H04L 1/1614

OTHER PUBLICATIONS

International Search Report and Written Opinion dated May 6, 2021 for international Application No. PCT/CN2020/107682.

* cited by examiner

METHOD AND APPARATUS FOR HYBRID AUTOMATIC REPEAT REQUEST ACKNOWLEDGEMENT (HARQ-ACK) CODEBOOK DETERMINATION FOR MULTI-CARRIER SCHEDULING

CROSS REFERENCE TO RELATED APPLICATIONS

This application is a national phase entry of International Application No. PCT/CN2020/107682, filed on Aug. 7, 2020, which is incorporated by reference in its entirety.

TECHNICAL FIELD

Embodiments of the present disclosure generally relate to wireless communication technology, and more particularly to hybrid automatic repeat request acknowledgement (HARQ-ACK) codebook determination.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a base station (BS) may transmit data signals to user equipment (UE) via a physical downlink shared channel (PDSCH). The PDSCH transmission to the UE may be dynamic PDSCH or semi-persistent scheduling (SPS) PDSCH. In dynamic scheduling, a BS may transmit, to a UE, downlink control information (DCI) (e.g., DCI format 1_0 or DCI format 1_1) via a corresponding physical downlink control channel (PDCCH). In SPS, a PDSCH transmission is configured to a UE by a BS through higher layer signaling, such as, for example, radio resource control (RRC) signaling. The transmission may occur at predetermined time instances and with predetermined parameters, as informed by the higher layer signaling or the DCI for activating the SPS transmission. The BS may transmit a DCI format for SPS PDSCH release to the UE.

A UE may transmit hybrid automatic repeat request acknowledgement (HARQ-ACK) feedback (e.g., included in a HARQ-ACK codebook) corresponding to PDSCH transmissions through a physical uplink shared channel (PUSCH) or physical uplink control channel (PUCCH).

There is a need for handling HARQ-ACK feedback determination in a wireless communication system.

SUMMARY

Some embodiments of the present disclosure provide a method for wireless communications performed by a user equipment (UE). The method may include: receiving a plurality of downlink control information (DCI) formats for scheduling physical downlink shared channel (PDSCH) transmissions on a plurality of serving cells, wherein each of the plurality of DCI formats may include a first indication information and a second indication information related to hybrid automatic repeat request acknowledgement (HARQ-ACK) information for a PDSCH transmission scheduled by a corresponding DCI format; receiving the PDSCH transmissions based on the plurality of DCI formats; generating a HARQ-ACK codebook based on the first indication information and the second indication information in the plurality of DCI formats; and transmitting the HARQ-ACK codebook.

Some embodiments of the present disclosure provide a method for wireless communications performed by a base station (BS). The method may include: transmitting a plurality of downlink control information (DCI) formats for scheduling physical downlink shared channel (PDSCH) transmissions on a plurality of serving cells, wherein each of the plurality of DCI formats may include a first indication information and a second indication information related to hybrid automatic repeat request acknowledgement (HARQ-ACK) information of a corresponding PDSCH transmission; transmitting the PDSCH transmissions based on the plurality of DCI formats; and receiving a HARQ-ACK codebook for the PDSCH transmissions.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
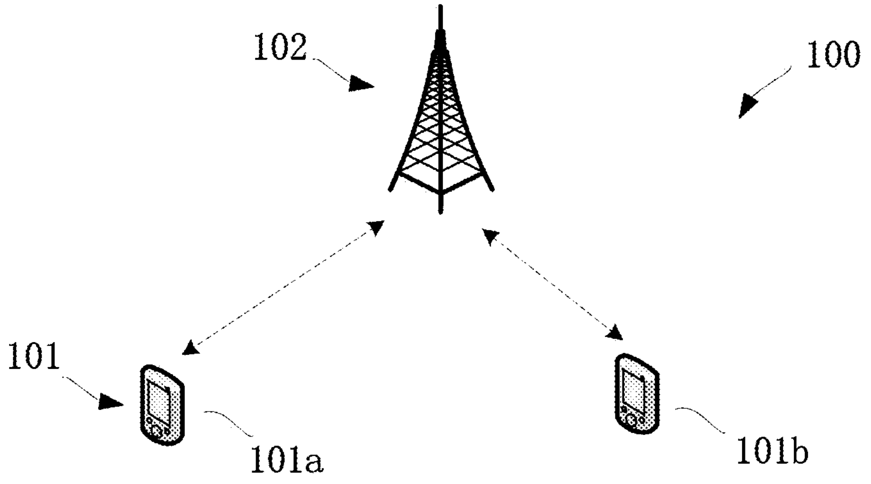
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

Carrier aggregation (CA) is referred to as spectrum aggregation or bandwidth aggregation, which supports a plurality of carriers for improving data rate. An individual unit frequency bound by CA is referred to as a component carrier (CC). A CC may correspond to a serving cell. CA provides the same effect as the case in which a plurality of bands, which are physically continuous or non-continuous in the frequency domain, are bound and used as a logically large band.

A wireless communication system (e.g., NR system) may support max 16 component carriers (CCs) in the case of carrier aggregation (CA), or max 32 CCs in the case of dual connectivity (DC). In some embodiments of the present disclosure, one DCI can schedule at most one carrier by either cross-carrier scheduling or self-scheduling. This may require relatively higher signaling overhead in terms of physical downlink control channels (PDCCHs) for scheduling physical downlink shared channels (PDSCHs) when the number of configured carriers for a UE is high. In some embodiments of the present disclosure, it is proposed that a single DCI can be used to schedule a plurality of PDSCHs (or PDSCH transmissions) on a plurality of configured carriers. These embodiments can greatly reduce the signaling overhead.

Figure 2:
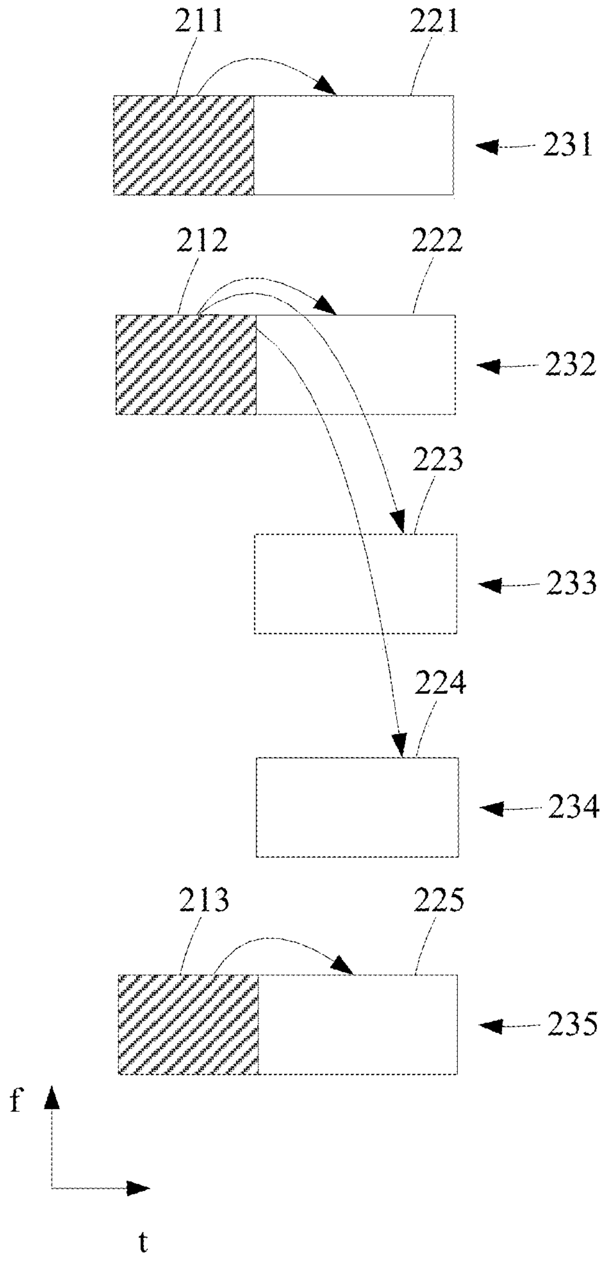
FIG. 2 illustrates a schematic diagram of a DCI format scheduling a plurality of PDSCH transmissions in accordance with some embodiments of the present disclosure.

FIG. 2 illustrates a schematic diagram of a DCI format scheduling a plurality of PDSCH transmissions in accordance with some embodiments of the present disclosure.

In some embodiments of the present disclosure, a plurality of CCs (e.g., CCs 231-235 in FIG. 2) may be configured for a UE. It should be understood that the sub-carrier spacings (SCSs) of the carriers configured for a UE may be the same or different. Each of the plurality of CCs may correspond to a respective serving cell of the UE. Each serving cell may be associated with a serving cell index. In some examples, the serving cell indexes corresponding to CCs 231-235 may be arranged in ascending order.

As shown in FIG. 2, instead of using five DCI formats to respectively schedule five PDSCH transmissions (e.g., PDSCH transmissions 221-225 in FIG. 2) on the five carriers (e.g., CCs 231-235), a BS may transmit less (e.g., three) DCI formats in a slot (e.g., slot n) to schedule the five PDSCH transmissions on the five carriers.

For example, DCI format #1 in PDCCH 211 may schedule PDSCH transmission 221 on carrier 231. DCI format #2 in PDCCH 212 may schedule a plurality of PDSCH transmissions, for example, PDSCH transmission 222 on carrier 232, PDSCH transmission 223 on carrier 233, and PDSCH transmission 224 on carrier 234. DCI format #3 in PDCCH 213 may schedule PDSCH transmission 225 on carrier 235.

Each DCI format may include downlink assignment index (DAI) information to facilitate hybrid automatic repeat request acknowledgement (HARQ-ACK) feedback for the PDSCH transmission(s) scheduled by the corresponding DCI format. For example, a DCI format may include at least one of a counter DAI field and a total DAI field.

In some embodiments of the present disclosure, when there may be at most one PDCCH monitoring occasion in each slot, the counter DAI in a DCI format may denote the accumulative number of downlink transmissions (e.g., PDCCH transmissions), up to the present serving cell and present slot. The accumulative number may be incremented first in increasing order of the serving cell index and then in increasing order of the slot index. The total DAI may denote the total number of downlink transmissions up to a present slot and shall be updated from slot to slot. The UE shall assume the same value of the total DAI in all downlink transmissions in a slot.

In some embodiments of the present disclosure, when there may be more than one PDCCH monitoring occasion in each slot, the counter DAI in a DCI format may denote the accumulative number of {serving cell, PDCCH monitoring occasion}-pair(s) in which PDSCH reception(s) or SPS PDSCH release associated with the DCI format is present, up to the current serving cell and current PDCCH monitoring occasion. The accumulative number may be incremented first in ascending order of the serving cell index and then in ascending order of the PDCCH monitoring occasion index. In some examples, the counter DAI may indicate an accumulative number of PDCCH receptions, up to the current serving cell and current PDCCH monitoring occasion. The total DAI in a DCI format may denote the total number of {serving cell, PDCCH monitoring occasion}-pair(s) in which PDSCH reception(s) or SPS PDSCH release associated with the DCI format is present, up to the current PDCCH monitoring occasion and is updated from one PDCCH monitoring occasion to next PDCCH monitoring occasion. The set of PDCCH monitoring occasions for a DCI format scheduling PDSCH receptions or SPS PDSCH release may be defined as the union of PDCCH monitoring occasions across active DL bandwidth parts of configured serving cells. PDCCH monitoring occasions may be indexed in an ascending order of the start times of the search space sets associated with a PDCCH monitoring occasion. The cardinality of the set of PDCCH monitoring occasions may define a total number of PDCCH monitoring occasions.

The counter DAI field or total DAI field may include at least two bits, indicating, for example, "00," "01," "10," or "11," which may be mapped to numeric values of "1," "2," "3," and "4," respectively. When the value is larger than 4, it shall be modular by 4 so as to be indicated by only two bits. For example, values of 1 and 5 are indicated by "00", values of 2 and 6 are indicated by "01", values of 3 and 7 are indicated by "10", values of 4 and 8 are indicated by "11", and so on. It should be understood that the values of the parameters in a DCI format mentioned in the context of the subject disclosure are only for illustrative purposes, and should not be construed as limiting the embodiments of the present disclosure.

Still referring to FIG. 2, based on the above definitions, DCI format #1 in PDCCH 211 may indicate a counter DAI having the numeric value of "1" and a total DAI having the numeric value of "3." DCI format #2 in PDCCH 212 may indicate a counter DAI having the numeric value of "2" and a total DAI having the numeric value of "3." DCI format #3 in PDCCH 213 may indicate a counter DAI having the numeric value of "3" and a total DAI having the numeric value of "3."

From the perspective of a UE, when no DCI format is missed, the UE can determine five PDSCH transmissions scheduled by the three DCI formats and may transmit corresponding HARQ-ACK feedback for the five PDSCH transmissions in a HARQ-ACK codebook. For example, assuming that a single HARQ-ACK information bit is required for each PDSCH transmission, the UE may generate HARQ-ACK information bits for PDSCH transmissions 221-225 (e.g., bit b1 for PDSCH transmission 221, bit b2 for PDSCH transmission 222, bit b3 for PDSCH transmission 223, bit b4 for PDSCH transmission 224, and bit b5 for PDSCH transmission 225) in a HARQ-ACK codebook (e.g., {b1, b2, b3, b4, b5}). Each HARQ-ACK information bit (e.g., b1, b2, b3, b4, or b5) may be either an acknowledgement (ACK) or negative ACK (NACK) information bit. It should be understood that two or more HARQ-ACK information bits (e.g., two or more ACK or NACK information bits) may be required for each PDSCH transmission in some other examples.

When a DCI format (e.g., DCI format #2) scheduling a plurality of PDSCHs is missed, a UE may determine that a DCI is missed based on the received DAIS, for example, the counter DAIS of DCI format #1 and DCI format #3. However, the UE cannot determine how many PDSCHs are scheduled by the missed DCI based on the received DAIS, for example, the total DAIS of DCI format #1 and DCI format #3. In some examples, the UE may assume that the missed DCI schedules a single PDSCH. As a result, the UE may generate a HARQ-ACK codebook including HARQ-ACK feedback (e.g., b1) for PDSCH transmission 221, HARQ-ACK feedback (e.g., NACK) for the assumed single PDSCH transmission, and HARQ-ACK feedback (e.g., b5) for PDSCH transmission 235. In other words, the UE may transmit a HARQ-ACK codebook, for example, {b1, NACK, b5} to the BS, which may expect HARQ-ACK feedback corresponding to five transmitted PDSCHs, for example, a HARQ-ACK codebook of {b1, b2, b3, b4, b5}. As a result, a misunderstanding of the HARQ-ACK codebook may happen between the BS and the UE. Moreover, since the HARQ-ACK codebook generated by the UE does not match what the BS expects, the BS may be unable to decode the HARQ-ACK codebook from the UE.

In the above scenario, as long as the number of actually transmitted PDSCHs is unknown to the UE, such misunderstanding between the UE and the BS may happen. Since the BS cannot receive the HARQ-ACK feedback for the transmitted PDSCHs due to the misunderstanding, the BS has to retransmit all the transmitted PDSCHs (in the above case, five PDSCHs has to be retransmitted), which would result in a degradation of downlink performance.

Solutions need to be provided to avoid such misunderstanding of the HARQ-ACK codebook between the UE and the BS. More details on the embodiments of the present disclosure will be illustrated in the following text in combination with the appended drawings.

In some embodiments of the present disclosure, a carrier-domain HARQ-ACK bundling scheme may be employed for determining a HARQ-ACK codebook in a wireless communication system that supports carrier aggregation (CA). Such bundling scheme may be applied to HARQ-ACK feedback for a plurality of PDSCH transmissions scheduled by the same DCI format. In the case that a DCI format schedules a single PDSCH transmission, the bundling scheme may not be applied to the HARQ-ACK feedback for the single PDSCH transmission.

Under the bundling scheme, a DCI format may include at least one of a counter DAI field and a total DAI field. The definitions of the counter DAI and the total DAI are the same as those as described above.

For example, still referring to FIG. 2, when a BS transmits three DCI formats in a slot to schedule five PDSCH transmissions on five carriers, since three DCI formats are transmitted, the total DAIs in the DCI formats (e.g., DCI format #1, DCI format #2, and DCI format #3) may indicate a numeric value "3."

As mentioned above, the counter DAI may indicate an accumulative number of PDCCH receptions for scheduling PDSCHs or indicating DL SPS release in a frequency-first and time-second manner. Therefore, the counter DAIs of DCI format #1, DCI format #2, and DCI format #3 may indicate numeric values "1," "2," and "3," respectively.

From the perspective of a UE, when no DCI format is missed, the UE can determine five PDSCH transmissions scheduled by the three DCI formats and may generate corresponding HARQ-ACK feedback for the five PDSCH transmissions in a HARQ-ACK codebook. For example, assuming that a single HARQ-ACK information bit is required for each PDSCH transmission, the UE may respectively generate HARQ-ACK information bits for PDSCH transmissions 221-225, for example, bit b1 for PDSCH transmission 221, bit b2 for PDSCH transmission 222, bit b3 for PDSCH transmission 223, bit b4 for PDSCH transmission 224, and bit b5 for PDSCH transmission 225.

Since DCI format #2 schedules a plurality of PDSCH transmissions (e.g., PDSCH transmission 222-224), the UE may further perform HARQ-ACK bundling among HARQ-ACK information bits for the plurality of PDSCH transmissions to generate a bundled HARQ-ACK information bit for the plurality of PDSCH transmissions. For example, the UE may perform a logical AND operation among HARQ-ACK information bits b2, b3, and b4 for PDSCH transmissions 222-224, and may obtain a bundled HARQ-ACK information bit c2 (e.g., c2=b2 AND b3 AND b4). The UE may then include the bundled HARQ-ACK information bit c2, instead of bits b2, b3, and b4, in a HARQ-ACK codebook for the five PDSCH transmissions. For example, the HARQ-ACK codebook may be {b1, c2, b5}.

It should be understood that two or more HARQ-ACK information bits (e.g., two or more acknowledgement (ACK) or negative ACK (NACK) information bits) may be required for each PDSCH transmission in some other examples. For example, in the case that two HARQ-ACK information bits are required for two transport blocks (TBs) of each PDSCH transmission when maximum two TBs can be transmitted by a single PDSCH, the HARQ-ACK codebook for the five PDSCH transmissions may be {d1, e2, d5}, wherein each of d1, e2, d5 includes two bits, bits d1 represent two HARQ-ACK information bits for two TBs of PDSCH transmission 221, bits e2 represent two bundled HARQ-ACK information bits for PDSCH transmissions 222-224, and bits d5 represent two HARQ-ACK information bits for two TBs of PDSCH transmission 225. In an embodiment, the first bit of bits e2 may be generated by performing logic AND operation among HARQ-ACK information bits for the first TB of each of the PDSCH transmissions 222-224, and the second bit of bits e2 may be generated by performing logic AND operation among HARQ-ACK information bits for the second TB of each of the PDSCH transmissions 222-224.

When a DCI format (e.g., DCI format #2) scheduling a plurality of PDSCHs (e.g., three) is missed, a UE may determine that a DCI is missed based on the received DAIs, for example, the counter DAIs of DCI format #1 and DCI format #3. However, the UE cannot determine how many PDSCHs are scheduled by the missed DCI (e.g., DCI format #2) based on the received DAIs, for example, the total DAIs of DCI format #1 and DCI format #3. In this scenario, since the HARQ-ACK bundling scheme is adopted, the UE does not need to know the number of missed PDSCHs scheduled by the missed DCI format. The UE may generate a NACK bit in the HARQ-ACK codebook for the missed PDSCH transmission(s) scheduled by the missed DCI format. For example, the HARQ-ACK codebook may be {b1, NACK, b5}. Upon receiving the HARQ-ACK codebook, the BS would know that some or all of the three PDSCHs scheduled by DCI format #2 are missed at the UE or not correctly decoded by the UE, and may retransmit the three PDSCHs to the UE.

In this way, regardless of whether the DCI format scheduling multiple PDSCHs is received or not by the UE, the HARQ-ACK codebook sizes between a UE and a BS are synchronized, and the HARQ-ACK information bits for the received PDSCHs are correctly ordered in a HARQ-ACK codebook. For example, the HARQ-ACK codebook of {b1, NACK, b5} guarantees that the UE and the BS have the same understanding of the HARQ-ACK information bits of b1 and b5 for both PDSCH transmission 221 and PDSCH transmission 225.

In some embodiments of the present disclosure, a DCI format for scheduling a PDSCH transmission(s) may include a first indication information and a second indication information related to HARQ-ACK information for the PDSCH transmission(s).

In some embodiments of the present disclosure, the first indication information may be the counter DAI as described above. For example, the first indication information may indicate an accumulative number of PDCCH receptions for scheduling PDSCHs or indicating DL SPS release, up to the current serving cell and current PDCCH monitoring occasion. The accumulative number may be incremented first in ascending order of the serving cell index and then in ascending order of the PDCCH monitoring occasions.

In some embodiments, the second indication information may indicate a total number of dynamic PDSCH receptions or PDCCH monitoring occasion(s) for downlink SPS release or a total number of dynamic PDSCH receptions and PDCCH monitoring occasion for downlink SPS release, up to the current PDCCH monitoring occasion. The value of the second indication information may be updated from one PDCCH monitoring occasion to next PDCCH monitoring occasion.

In some other embodiments, the second indication information may indicate a total number of PDSCH receptions or PDCCH monitoring occasion(s) for downlink SPS release or a total number of PDSCH receptions and PDCCH monitoring occasion for downlink SPS release, up to the current PDCCH monitoring occasion. A UE may subtract the number of SPS PDSCHs from the second indication information, and thus determine the total number of dynamic PDSCH receptions or/and PDCCH monitoring occasion(s) for downlink SPS release.

In some embodiments of the present disclosure, the second indication information may be the total DAI indicated in the DCI. In other words, in these embodiments, the definition of the total DAI is different from those as described above. In some embodiments of the present disclosure, the second indication information may be indicated in a dedicated (new) field, which is different from the total DAI field, in the DCI.

For example, still referring to FIG. 2, when a BS transmits three DCI formats in a slot to schedule five PDSCH transmissions on five carriers, since five PDSCH transmissions are transmitted from the BS (which is supposed to correspond to five PDSCH receptions at a UE), the second indication information in the DCI formats (e.g., DCI format #1, DCI format #2, and DCI format #3) may indicate a numeric value "5." On the other hand, the first indication information in DCI format #1 in PDCCH 211 may indicate a numeric value "1"; the first indication information in DCI format #2 in PDCCH 212 may indicate a numeric value "2"; and the first indication information in DCI format #3 in PDCCH 213 may indicate a numeric value "3."

From the perspective of a UE, when no DCI format is missed, the UE can determine five PDSCH transmissions scheduled by the three DCI formats and may transmit corresponding HARQ-ACK feedback for the five PDSCH transmissions in a HARQ-ACK codebook. For example, assuming that a single HARQ-ACK information bit is required for each PDSCH transmission, the UE may generate five HARQ-ACK information bits for PDSCH transmissions 221-225, respectively, in a HARQ-ACK codebook. For example, the UE may generate bit b1 for PDSCH transmission 221, bit b2 for PDSCH transmission 222, bit b3 for PDSCH transmission 223, bit b4 for PDSCH transmission 224, and bit b5 for PDSCH transmission 225. It should be understood that two or more HARQ-ACK information bits (e.g., two or more acknowledgement (ACK) or negative ACK (NACK) information bits) may be required for each PDSCH transmission in some other examples.

The ordering of these HARQ-ACK information bits in the HARQ-ACK codebook may be based on the first indication information, for example, in ascending order of the value of first indication information. For a DCI format (e.g., DCI format #2) scheduling a plurality of PDSCH transmissions, an ordering of the HARQ-ACK information bits for the plurality of PDSCH transmissions may be based on the indexes of the serving cells where the plurality of PDSCH transmissions are transmitted.

For example, since the first indication information in DCI format #1, DCI format #2, and DCI format #3 may respectively indicate values of "1," "2," and "3," the HARQ-ACK information bit (e.g., b1) for the PDSCH transmission scheduled by DCI format #1 may be the first bit in the HARQ-ACK codebook, followed successively by the HARQ-ACK information bits for the PDSCH transmissions scheduled by DCI format #2 and the HARQ-ACK information bit (e.g., b5) for the PDSCH transmissions scheduled by DCI format #3. Moreover, assuming that the serving cell indexes corresponding to CCs 232-234 are arranged in an ascending order, the ordering of the HARQ-ACK information bits (e.g., b2-b4) for the PDSCH transmissions scheduled by DCI format #2 in the HARQ-ACK codebook may be {b2, b3, b4} (or {b4, b3, b2}). That is, the HARQ-ACK codebook generated by the UE may be {b1, b2, b3, b4, b5} (or {b1, b4, b3, b2, b5}).

When a DCI format (e.g., DCI format #2) scheduling a plurality of PDSCHs is missed, a UE may determine that a DCI is missed based on the first indication information in the received DCI format #1 and DCI format #3. The UE may further know that the missed DCI format schedules three PDSCHs based on the second indication information in the received DCI format #1 and DCI format #3. Accordingly, the UE may generate a HARQ-ACK codebook including HARQ-ACK feedback (e.g., b1) for PDSCH transmission 221, three respective HARQ-ACK feedback (e.g., three NACKs) for the three PDSCH transmissions 222-224, and HARQ-ACK feedback (e.g., b5) for PDSCH transmission 235. In other words, the UE may transmit a HARQ-ACK codebook, for example, {b1, NACK, NACK, NACK, b5}, to the BS, which also expects respective HARQ-ACK feedback corresponding to five transmitted PDSCHs.

In this way, a UE can identify the number of missed PDSCHs. Moreover, the HARQ-ACK codebook sizes between a UE and a BS are synchronized, and the HARQ-ACK information bits for the received PDSCHs are correctly ordered in a HARQ-ACK codebook. f For example, the HARQ-ACK codebook of {b1, NACK, NACK, NACK, b5} guarantees that the UE and the BS have the same understanding of the HARQ-ACK information bits of b1 and b5 for both PDSCH transmission 221 and PDSCH transmission 225.

In some embodiments of the present disclosure, the first indication information may indicate the accumulative number of dynamic PDSCH receptions or PDCCH monitoring occasion(s) for DL SPS release, up to the current serving cell and the current PDCCH monitoring occasion. The accumulative number may be incremented in a frequency-first and time-second manner, for example, first in ascending order of a serving cell index and then in ascending order of an index of the PDCCH monitoring occasion (corresponding to PDSCH transmission occasion from the perspective of a BS).

In some embodiments, the second indication information may indicate a total number of dynamic PDSCH receptions or PDCCH monitoring occasion(s) for downlink SPS release or a total number of dynamic PDSCH receptions and PDCCH monitoring occasion(s) for downlink SPS release, up to the current PDCCH monitoring occasion. The value of the second indication information may be updated from one PDCCH monitoring occasion to next PDCCH monitoring occasion.

In some other embodiments, the second indication information may indicate a total number of PDSCH receptions or PDCCH monitoring occasion(s) for downlink SPS release or a total number of PDSCH receptions and PDCCH monitoring occasion(s) for downlink SPS release, up to the current PDCCH monitoring occasion. A UE may subtract the number of configured SPS PDSCHs from the second indication information, and thus determine the total number of dynamic PDSCH receptions or/and PDCCH monitoring occasion(s) for downlink SPS release.

In some embodiments of the present disclosure, the second indication information may be the total DAI indicated in the DCI. In some embodiments of the present disclosure, the second indication information may be indicated in a dedicated (new) field, which is different from the total DAI field, in the DCI.

For example, still referring to FIG. 2, when a BS transmits three DCI formats in a slot to schedule five PDSCH transmissions on five carriers, since five PDSCH transmissions are transmitted from the BS (which is supposed to correspond to five PDSCH receptions at a UE), the values of the second indication information in the DCI formats (e.g., DCI format #1, DCI format #2, and DCI format #3) may indicate a numeric value "5."

On the other hand, the first indication information may indicate the accumulative number of dynamic PDSCH receptions or PDCCH monitoring occasion(s) for DL SPS release, in a frequency-first and time-second manner. Therefore, the first indication information in DCI format #1 in PDCCH 211 may indicate a numeric value "1"; the first indication information in DCI format #2 in PDCCH 212 may indicate a numeric value "4"; and the first indication information in DCI format #3 in PDCCH 213 may indicate a numeric value "5."

From the perspective of a UE, when no DCI format is missed, the UE can determine five PDSCH transmissions scheduled by the three DCI formats and may transmit corresponding HARQ-ACK feedback for the five PDSCH transmissions in a HARQ-ACK codebook. For example, assuming that a single HARQ-ACK information bit is required for each PDSCH transmission, the UE may generate five HARQ-ACK information bits (e.g., b1, b2, b3, b4, and b5, respectively) for PDSCH transmissions 221-225, in a HARQ-ACK codebook. It should be understood that two or more HARQ-ACK information bits (e.g., two or more acknowledgement (ACK) or negative ACK (NACK) information bits) may be required for each PDSCH transmission in some other examples.

The ordering of these HARQ-ACK information bits in the HARQ-ACK codebook may be based on the first indication information, for example, in ascending order of the value of first indication information. For a DCI format (e.g., DCI format #2) scheduling a plurality of PDSCH transmissions, an ordering of the HARQ-ACK information bits (e.g., b2, b3, and b4) for the plurality of PDSCH transmissions may be based on the indexes of the serving cells where the plurality of PDSCH transmissions (PDSCH transmissions 222-224) are transmitted. For example, the HARQ-ACK codebook generated by the UE may be {b1, b2, b3, b4, b5} (or {b1, b4, b3, b2, b5}).

When a DCI format (e.g., DCI format #2) scheduling a plurality of PDSCHs is missed, a UE may determine that at least one (e.g., one, two, or three) DCI formats may be missed based on the first indication information in the received DCI format #1 and DCI format #3. The UE can determine that the exact number of PDSCHs scheduled by the missed DCI format(s) based on the first and second indication information in the received DCI format #1 and DCI format #3. That is, the UE may determine that the missed DCI format(s) schedules three PDSCHs. Accordingly, the UE may generate a HARQ-ACK codebook including HARQ-ACK feedback (e.g., b1) for PDSCH transmission 221, three respective HARQ-ACK feedback (e.g., three NACKs) for the three PDSCH transmissions 222-224, and HARQ-ACK feedback (e.g., b5) for PDSCH transmission 235. In other words, the UE may transmit a HARQ-ACK codebook, for example, {b1, NACK, NACK, NACK, b5}, to the BS, which also expects HARQ-ACK feedback corresponding to five transmitted PDSCHs.

In this way, a UE can identify the number of missed PDSCHs. Moreover, the HARQ-ACK codebook sizes between a UE and a BS are synchronized, and the HARQ-ACK information bits for the received PDSCHs are correctly ordered in a HARQ-ACK codebook. For example, the HARQ-ACK codebook of {b1, NACK, NACK, NACK, b5} guarantees that the UE and the BS have the same understanding of the HARQ-ACK information bits of b1 and b5 for both PDSCH transmission 221 and PDSCH transmission 225.

In some embodiments of the present disclosure, the first indication information may indicate an ordering of HARQ-ACK information bits in the HARQ-ACK codebook for the scheduled PDSCH transmissions. The accumulative number may be incremented first in ascending order of a serving cell index and then in ascending order of an index of the PDCCH monitoring occasion (corresponding to a PDSCH transmission from the perspective of a BS).

In some embodiments of the present disclosure, in response to a DCI format scheduling a single PDSCH transmission, the first indication information in this DCI format indicates the ordering of the HARQ-ACK information bits in the HARQ-ACK codebook for the single PDSCH transmission.

In some embodiments of the present disclosure, in response to a DCI format scheduling more than one PDSCH transmission, the first indication information in this DCI format indicates the ordering of the HARQ-ACK information bits in the HARQ-ACK codebook for the first scheduled PDSCH transmission of the more than one PDSCH transmission. The HARQ-ACK information bit(s) for the remaining PDSCH transmission(s) of the more than one PDSCH transmission may immediately follow the HARQ-ACK information bit for the first scheduled PDSCH transmission in the HARQ-ACK codebook. In some examples, an ordering of the HARQ-ACK information bits for the remaining PDSCH transmission(s) may be based on the index(s) of the serving cells where the remaining PDSCH transmission(s) is transmitted.

In some embodiments, the second indication information may indicate a total number of dynamic PDSCH receptions or PDCCH monitoring occasion(s) for downlink SPS release or a total number of dynamic PDSCH receptions and PDCCH monitoring occasion(s) for downlink SPS release, up to the current PDCCH monitoring occasion. The value of the second indication information may be updated from one PDCCH monitoring occasion to next PDCCH monitoring occasion.

In some other embodiments, the second indication information may indicate a total number of PDSCH receptions or PDCCH monitoring occasion(s) for downlink SPS release or a total number of PDSCH receptions and PDCCH monitoring occasion(s) for downlink SPS release, up to the current PDCCH monitoring occasion. A UE may subtract the number of configured SPS PDSCHs from the second indication information, and thus determine the total number of dynamic PDSCH receptions or/and PDCCH monitoring occasion(s) for downlink SPS release.

In some embodiments of the present disclosure, the second indication information may be the total DAI indicated in the DCI. In some embodiments of the present disclosure, the second indication information may be indicated in a dedicated (new) field, which is different from the total DAI field, in the DCI.

For example, still referring to FIG. 2, when a BS transmits three DCI formats in a slot to schedule five PDSCH transmissions on five carriers, since five PDSCH transmissions are transmitted from the BS (which is supposed to correspond to five PDSCH receptions at a UE), the values of the second indication information in the DCI formats (e.g., DCI format #1, DCI format #2, and DCI format #3) may indicate a numeric value "5."

On the other hand, since DCI format #1 and DCI format #3 schedule a single PDSCH (e.g., PDSCH transmissions 221 and 225, respectively), the first indication information in DCI format #1 and DCI format #3 may indicate the ordering of the HARQ-ACK feedback for PDSCH transmissions 221 and 225, respectively. Since DCI format #2 schedules a plurality of PDSCHs (e.g., PDSCH transmissions 222-224), the first indication information in DCI format #2 may indicate the ordering of the HARQ-ACK feedback for a first scheduled PDSCH transmission (e.g., PDSCH transmission 222). The HARQ-ACK feedback for PDSCH transmissions 223 and 224 may immediately follow that of PDSCH transmission 222.

For example, in DCI format #1, the first indication information may indicate a numeric value "1," which indicates the bit ordering of the HARQ-ACK feedback for PDSCH transmission 221. That is, the bit positions for HARQ-ACK information bits for PDSCH transmission 221 in the HARQ-ACK codebook may be the first bit.

In DCI format #2, the first indication information may indicate a numeric value "2," which indicates the bit ordering of the HARQ-ACK feedback for the first scheduled PDSCH (e.g., PDSCH transmission 222) of the three PDSCHs. That is, the bit position for the HARQ-ACK information bit for PDSCH transmission 222 in the HARQ-ACK codebook may be the second bit. In the HARQ-ACK codebook, the HARQ-ACK information bit for PDSCH transmission 222 is followed by HARQ-ACK information bits for PDSCH transmissions 223 and 224. That is, the bit positions for HARQ-ACK information bits for PDSCH transmissions 223 and 224 in the HARQ-ACK codebook may be the third and fourth bits (for example, ordered according to the ascending serving cell indexes).

In DCI format #3, the first indication information may indicate a numeric value "5," which indicates the bit ordering of the HARQ-ACK feedback for PDSCH transmission 225. That is, the bit positions for HARQ-ACK information bits for PDSCH transmission 225 in the HARQ-ACK codebook may be the fifth bit.

From the perspective of a UE, when no DCI format is missed, the UE can determine five PDSCH transmissions scheduled by the three DCI formats and may transmit corresponding HARQ-ACK feedback for the five PDSCH transmissions in a HARQ-ACK codebook. For example, assuming that a single HARQ-ACK information bit is required for each PDSCH transmission, the UE may generate HARQ-ACK information bits for PDSCH transmissions 221-225, respectively, in a HARQ-ACK codebook (e.g., {b1, b2, b3, b4, b5}) according to the ordering of the HARQ-ACK feedback. It should be understood that two or more HARQ-ACK information bits (e.g., two or more acknowledgement (ACK) or negative ACK (NACK) information bits) may be required for each PDSCH transmission in some other examples.

When a DCI format (e.g., DCI format #2) scheduling a plurality of PDSCHs is missed, a UE may generate the first HARQ-ACK information bit for PDSCH transmission 221 and the fifth HARQ-ACK information bit for PDSCH transmission 225 in a HARQ-ACK codebook based on the first indication information in the received DCI format #1 and DCI format #3. The UE may further use three NACK bits for padding the second bit, third bit and fourth bits in the HARQ-ACK codebook. For example, the HARQ-ACK codebook generated by the UE may be {b1, NACK, NACK, NACK, b5}.

By explicitly indicating the bit positions of the HARQ-ACK feedback in the HARQ-ACK codebook, the HARQ-ACK codebook sizes between a UE and a BS are synchronized, and the HARQ-ACK information bits for the received PDSCHs are correctly ordered in a HARQ-ACK codebook. For example, the HARQ-ACK codebook of {b1, NACK, NACK, NACK, b5} guarantees that the UE and the BS have the same understanding of the HARQ-ACK information bits of b1 and b5 for both PDSCH transmission 221 and PDSCH transmission 225.

Figure 3:
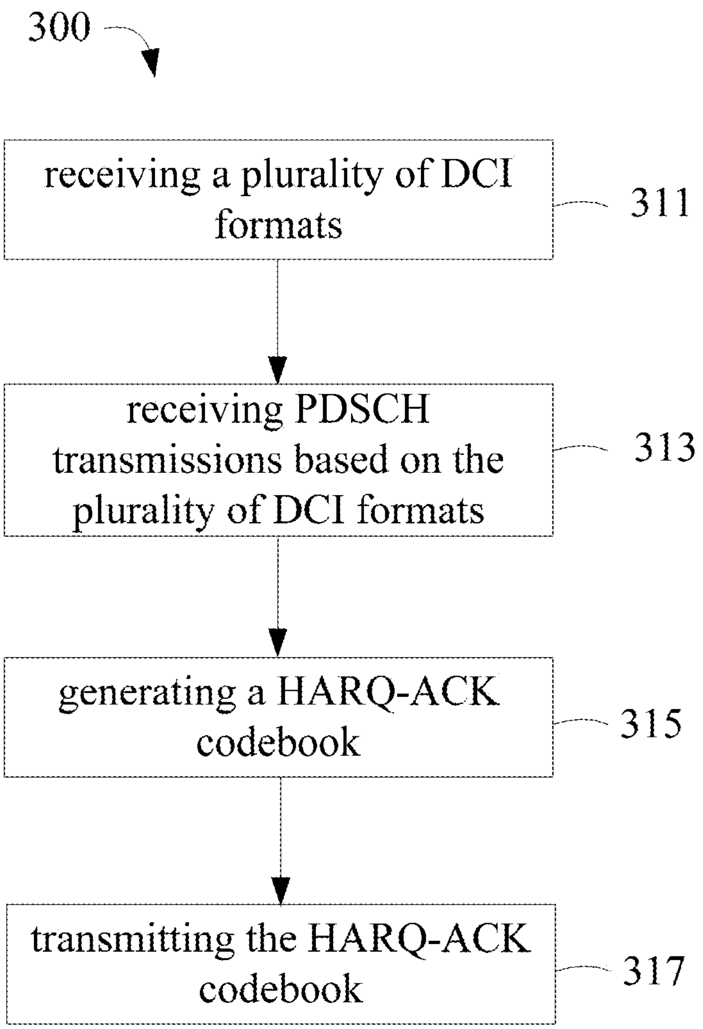
FIG. 3 illustrates a flow chart of an exemplary procedure of wireless communications in accordance with some embodiments of the present disclosure.

FIG. 3 illustrates a flow chart of an exemplary procedure 300 for wireless communications in accordance with some embodiments of the present disclosure. Details described in all of the foregoing embodiments of the present disclosure are applicable for the embodiments shown in FIG. 3. The procedure may be performed by a UE, for example, UE 101 in FIG. 1.

Referring to FIG. 3, in operation 311, a UE may receive a plurality of DCI formats from a BS. The plurality of DCI formats may schedule PDSCH transmissions on a plurality of serving cells. Each of the plurality of DCI formats may include a first indication information and a second indication information related to HARQ-ACK information for a PDSCH transmission scheduled by a corresponding DCI format.

In operation 313, the UE may receive the PDSCH transmissions based on the plurality of DCI formats. In operation 315, the UE may generate a HARQ-ACK codebook based on the first indication information and the second indication information in the plurality of DCI formats.

The descriptions of the first indication information and the second indication information described above with respect to FIG. 2 may apply here.

For example, in some instances, the first indication information may indicate an accumulative number of PDCCH receptions, up to the current serving cell and the current PDCCH monitoring occasion. In some instances, the first indication information may indicate the accumulative number of dynamic PDSCH receptions or PDCCH monitoring occasion(s) for DL SPS release, up to the current serving cell and the current PDCCH monitoring occasion.

In some instances, the first indication information may indicate an ordering of HARQ-ACK information bits in the HARQ-ACK codebook for the scheduled PDSCH transmissions. In response to a DCI format of the plurality of DCI formats scheduling more than one PDSCH transmission, the first indication information in the DCI format of the plurality of DCI formats may indicate the ordering of the HARQ-ACK information bits in the HARQ-ACK codebook for the first scheduled PDSCH transmission of the more than one PDSCH transmission.

In some instances, the second indication information may indicate a total number of dynamic PDSCH receptions or PDCCH monitoring occasion(s) for downlink SPS release, up to the current PDCCH monitoring occasion. In some other instances, the second indication information indicates a total number of PDSCH receptions or PDCCH monitoring occasion(s) for downlink SPS release, up to the current PDCCH monitoring occasion.

The UE may determine whether a DCI format is missed based on, for example, the first indication information in the received DCI format(s). In response to at least one DCI format being missed, the UE may determine HARQ-ACK information bits in the HARQ-ACK codebook for PDSCH transmissions scheduled by the at least one DCI format based on the first indication information and the second indication information in the plurality of DCI formats, as described above with respect to FIG. 2.

In some embodiments of the present disclosure, a carrier-domain HARQ-ACK bundling scheme as described above may be employed.

For example, in response to no DCI format being missed and in response to a DCI format of the plurality of DCI formats scheduling more than one PDSCH transmission, the UE may perform HARQ-ACK bundling among HARQ-ACK information bits for the more than one PDSCH transmission to generate a bundled HARQ-ACK information bit for the more than one PDSCH transmission. The UE may include the bundled HARQ-ACK information bit in the HARQ-ACK codebook. In some embodiments, the UE may perform HARQ-ACK bundling among the HARQ-ACK information bits for the more than one PDSCH transmission by performing a logical AND operation among HARQ-ACK information bits for the more than one PDSCH transmission. In response to at least one DCI format being missed, the UE may generate a NACK bit in the HARQ-ACK codebook for the PDSCH transmissions scheduled by the at least one missed DCI format. That is, regardless of the number of PDSCH transmissions scheduled by a missed DCI format, the UE may generate one NACK bit in the HARQ-ACK codebook for the PDSCH transmission(s) scheduled by this missed DCI format.

In some embodiments of the present disclosure, in response to a DCI format of the plurality of DCI formats scheduling more than one PDSCH transmission, an ordering of the HARQ-ACK information bits in the HARQ-ACK codebook for the more than one PDSCH transmission may be based on the indexes of the serving cells where the more than one PDSCH transmission is transmitted.

In operation 317, the UE may transmit the generated HARQ-ACK codebook to the BS.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
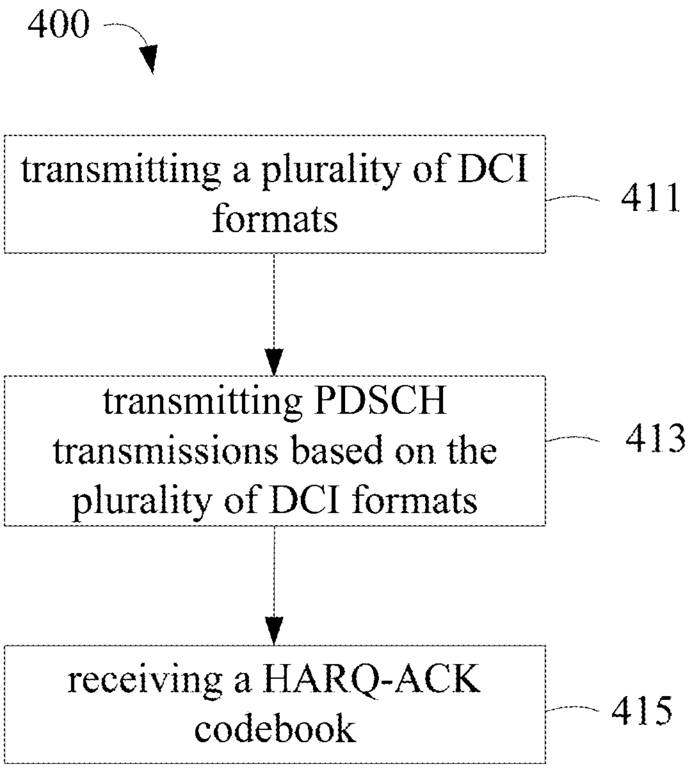
FIG. 4 illustrates a flow chart of an exemplary procedure of wireless communications in accordance with some embodiments of the present disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. The procedure may be performed by a BS, for example, BS 102 in FIG. 1.

Referring to FIG. 4, in operation 411, a BS may transmit a plurality of DCI formats to a UE. The plurality of DCI formats may schedule PDSCH transmissions on a plurality of serving cells of the UE. Each of the plurality of DCI formats may include a first indication information and a second indication information related to HARQ-ACK information of a corresponding PDSCH transmission. In operation 413, the BS may transmit the PDSCH transmissions based on the plurality of DCI formats. In operation 415, the BS may receive a HARQ-ACK codebook for the PDSCH transmissions.

The descriptions of the first indication information and the second indication information described above with respect to FIG. 2 may apply here.

For example, in some instances, the first indication information may indicate an accumulative number of PDCCH transmissions, up to the current serving cell and the current PDCCH monitoring occasion. In some instances, the first indication information may indicate the accumulative number of dynamic PDSCH transmissions or PDCCH transmissions for SPS PDSCH release, up to the current serving cell and the current PDCCH monitoring occasion.

In some instances, the first indication information may indicate an ordering of HARQ-ACK information bits in the HARQ-ACK codebook for the scheduled PDSCH transmissions. In response to a DCI format of the plurality of DCI formats scheduling more than one PDSCH transmission, the first indication information in the DCI format of the plurality of DCI formats may indicate the ordering of the HARQ-ACK information bits in the HARQ-ACK codebook for the first scheduled PDSCH transmission of the more than one PDSCH transmission.

In some instances, the second indication information may indicate a total number of dynamic PDSCH transmissions or PDCCH transmission for SPS PDSCH release, up to the current PDCCH monitoring occasion. In some other instances, the second indication information may indicate a total number of PDSCH transmissions or PDCCH transmission for SPS PDSCH release, up to the current PDCCH monitoring occasion.

The HARQ-ACK information bits in the HARQ-ACK codebook may be based on the first indication information and the second indication information in the plurality of DCI formats, as described above with respect to FIG. 2.

In some embodiments of the present disclosure, a carrier-domain HARQ-ACK bundling scheme as described above may be employed.

For example, in response to a DCI format of the plurality of DCI formats scheduling more than one PDSCH transmission, the HARQ-ACK codebook may include HARQ-ACK feedback for the more than one PDSCH transmission. The HARQ-ACK feedback for the more than one PDSCH transmission may be generated by performing a bundling operation (e.g., a logical AND operation) among HARQ-ACK information bits for the more than one PDSCH transmission. That is, for a DCI format scheduling of more than one PDSCH transmission, the HARQ-ACK codebook may only include one HARQ-ACK information bit (assuming that a single HARQ-ACK information bit is required for each PDSCH transmission) for the more than one PDSCH transmission.

In some embodiments of the present disclosure, in response to a DCI format of the plurality of DCI formats scheduling more than one PDSCH transmission, an ordering of the HARQ-ACK information bits in the HARQ-ACK codebook for the more than one PDSCH transmission may be based on the indexes of the serving cells where the more than one PDSCH transmission is transmitted.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
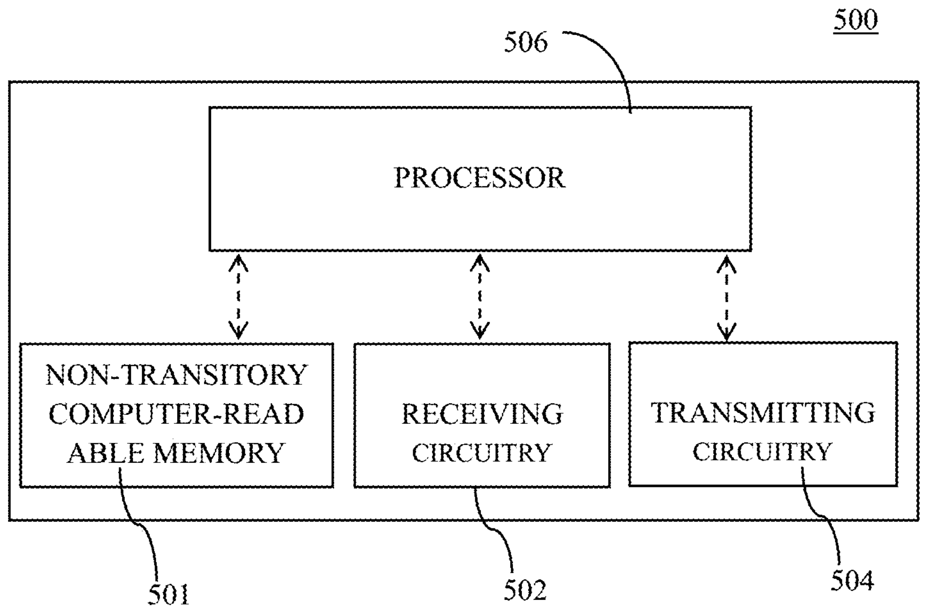
FIG. 5 illustrates a block diagram of an exemplary apparatus in accordance with some embodiments of the present disclosure.

FIG. 5 illustrates a block diagram of an exemplary apparatus 500 according to some embodiments of the present disclosure.

As shown in FIG. 5, the apparatus 500 may include at least one non-transitory computer-readable medium 501, at least one receiving circuitry 502, at least one transmitting circuitry 504, and at least one processor 506 coupled to the non-transitory computer-readable medium 501, the receiving circuitry 502 and the transmitting circuitry 504. The apparatus 500 may be a base station side apparatus (e.g., a BS) or a communication device (e.g., a UE).

Although in this figure, elements such as the at least one processor 506, transmitting circuitry 504, and receiving circuitry 502 are described in the singular, the plural is contemplated unless a limitation to the singular is explicitly stated. In some embodiments of the present application, the receiving circuitry 502 and the transmitting circuitry 504 are combined into a single device, such as a transceiver. In certain embodiments of the present application, the apparatus 500 may further include an input device, a memory, and/or other components.

In some embodiments of the present disclosure, the non-transitory computer-readable medium 501 may have stored thereon computer-executable instructions to cause a processor to implement the method with respect to the UEs as described above. For example, the computer-executable instructions, when executed, cause the processor 506 interacting with receiving circuitry 502 and transmitting circuitry 504, so as to perform the operations with respect to the UEs described in FIGS. 1-4.

In some embodiments of the present disclosure, the non-transitory computer-readable medium 501 may have stored thereon computer-executable instructions to cause a processor to implement the method with respect to the BSs as described above. For example, the computer-executable instructions, when executed, cause the processor 506 interacting with receiving circuitry 502 and transmitting circuitry 504, so as to perform the operations with respect to the BSs described in FIGS. 1-4.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms “includes”, “including”, or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by “a”, “an”, or the like does not, without more constraints, preclude the existence of additional identical elements in the process, method, article, or apparatus that includes the element. Also, the term “another” is defined as at least a second or more. The term “having” and the like, as used herein, are defined as “including.”

What is claimed:

1. A user equipment (UE) for wireless communication, comprising:

at least one memory; and at least one processor coupled with the at least one memory and configured to cause the UE to:

receive a plurality of downlink control information (DCI) formats for scheduling physical downlink shared channel (PDSCH) transmissions on a plurality of serving cells, wherein each DCI format of the plurality of DCI formats includes a first indication information and a second indication information related to hybrid automatic repeat request acknowledgement (HARQ-ACK) information for a PDSCH transmission scheduled by a corresponding DCI format, wherein at least one DCI format of the plurality of DCI formats schedules multiple PDSCH transmissions for multiple serving cells of the plurality of serving cells, wherein the first indication information indicates a counter downlink assignment index (DAI) that denotes an accumulative number of PDSCH receptions, and wherein the second indication information indicates a total DAI that denotes a total number of PDSCH receptions;

receive PDSCH transmissions based on the plurality of DCI formats;

generate a HARQ-ACK codebook based on the first indication information and the second indication information in the plurality of DCI formats; and transmit the HARQ-ACK codebook.

2. The UE of claim 1, wherein the first indication information indicates an accumulative number of physical downlink control channel (PDCCH) receptions, up to a current serving cell and a current PDCCH monitoring occasion.

3. The UE of claim 1, wherein the first indication information indicates an accumulative number of dynamic PDSCH receptions or physical downlink control channel (PDCCH) monitoring occasions for a downlink semi-persistent scheduling (SPS) release, up to a current serving cell and a current PDCCH monitoring occasion.

4. The UE of claim 1, wherein the first indication information indicates an ordering of HARQ-ACK information bits in the HARQ-ACK codebook for the scheduled PDSCH transmissions.

5. The UE of claim 2, wherein the second indication information indicates a total number of dynamic PDSCH receptions or PDCCH monitoring occasion for a downlink semi-persistent scheduling (SPS) release, up to a current PDCCH monitoring occasion.

6. The UE of claim 5, wherein the at least one processor is further configured to cause the UE to:

determine whether a DCI format is missed; and in response to the DCI format being missed, determine HARQ-ACK information bits in the HARQ-ACK codebook for PDSCH transmissions scheduled by the at least one DCI format based on the first indication information and the second indication information in the plurality of DCI formats.

7. The UE of claim 2, wherein the second indication information indicates a total number of PDSCH receptions or PDCCH monitoring occasions for a downlink semi-persistent scheduling (SPS) release, up to a current PDCCH monitoring occasion.

8. The UE of claim 1, wherein the at least one processor is further configured to cause the UE to:

determine whether a DCI format is missed; and in response to no DCI format being missed and in response to a DCI format of the plurality of DCI formats scheduling the multiple PDSCH transmissions, perform HARQ-ACK bundling among HARQ-ACK information bits for the multiple PDSCH transmissions to generate a bundled HARQ-ACK information bit for the multiple PDSCH transmissions; and include the bundled HARQ-ACK information bit in the HARQ-ACK codebook.

9. The UE of claim 1, wherein the at least one processor is further configured to cause the UE to:

determine whether a DCI format is missed; and in response to at least one DCI format being missed, generate a negative acknowledgement (NACK) bit in the HARQ-ACK codebook for the PDSCH transmissions scheduled by the at least one DCI format.

10. The UE of claim 1, wherein, in response to a DCI format of the plurality of DCI formats scheduling the multiple PDSCH transmissions, an ordering of the HARQ-ACK information bits in the HARQ-ACK codebook for the multiple PDSCH transmissions is based on indexes of serving cells where each of the multiple PDSCH transmissions are transmitted.

11. A base station (BS) for wireless communication, comprising:

at least one memory; and at least one processor coupled with the at least one memory and configured to cause the BS to:

transmit a plurality of downlink control information (DCI) formats for scheduling physical downlink shared channel (PDSCH) transmissions on a plurality of serving cells, wherein each DCI format of the plurality of DCI formats includes a first indication information and a second indication information related to hybrid automatic repeat request acknowledgement (HARQ-ACK) information of a corresponding PDSCH transmission, and wherein at least one DCI format of the plurality of DCI formats schedules multiple PDSCH transmissions for multiple serving cells of the plurality of serving cells, wherein the first indication information indicates a counter downlink assignment index (DAI) that denotes an accumulative number of PDSCH receptions, and wherein the second indication information indicates a total DAI that denotes a total number of PDSCH receptions;

transmit the PDSCH transmissions based on the plurality of DCI formats; and receive a HARQ-ACK codebook for the PDSCH transmissions.

12. The BS of claim 11, wherein the first indication information indicates an accumulative number of physical downlink control channel (PDCCH) transmissions, up to a current serving cell and a current PDCCH monitoring occasion.

13. The BS of claim 11, wherein the first indication information indicates an accumulative number of dynamic PDSCH transmissions or physical downlink control channel (PDCCH) transmissions for a semi-persistent scheduling (SPS) PDSCH release, up to a current serving cell and a current PDCCH monitoring occasion.

14. The BS of claim 11, wherein the first indication information indicates an ordering of HARQ-ACK information bits in the HARQ-ACK codebook for the scheduled PDSCH transmissions.

15. The BS of claim 14, wherein, in response to a DCI format of the plurality of DCI formats scheduling the multiple PDSCH transmissions, the first indication information in the DCI format of the plurality of DCI formats indicates an ordering of the HARQ-ACK information bit in the HARQ-ACK codebook for a first scheduled PDSCH transmission of the multiple PDSCH transmissions.

16. The BS of claim 12, wherein the second indication information indicates a total number of dynamic PDSCH transmissions or PDCCH transmission for a semi-persistent scheduling (SPS) PDSCH release, up to a current PDCCH monitoring occasion.

17. The BS of claim 12, wherein the second indication information indicates a total number of PDSCH transmissions or PDCCH transmission for a semi-persistent scheduling (SPS) PDSCH release, up to a current PDCCH monitoring occasion.

18. The BS of claim 11, wherein, in response to a DCI format of the plurality of DCI formats scheduling the multiple PDSCH transmissions, the HARQ-ACK codebook includes HARQ-ACK feedback for the multiple PDSCH transmissions.

19. The BS of claim 11, wherein, in response to a DCI format of the plurality of DCI formats scheduling the multiple PDSCH transmissions, an ordering of the HARQ-ACK information bits in the HARQ-ACK codebook for the multiple PDSCH transmissions is based on indexes of serving cells where the multiple PDSCH transmissions are transmitted.

20. A method performed by user equipment (UE), the method comprising:

receiving a plurality of downlink control information (DCI) formats for scheduling physical downlink shared channel (PDSCH) transmissions on a plurality of serving cells, wherein each DCI format of the plurality of DCI formats includes a first indication information and a second indication information related to hybrid automatic repeat request acknowledgement (HARQ-ACK) information for a PDSCH transmission scheduled by a corresponding DCI format, and wherein at least one DCI format of the plurality of DCI formats schedules multiple PDSCH transmissions for multiple serving cells of the plurality of serving cells, wherein the first indication information indicates a counter downlink assignment index (DAI) that denotes an accumulative number of PDSCH receptions, and wherein the second indication information indicates a total DAI that denotes a total number of PDSCH receptions;

receiving the PDSCH transmissions based on the plurality of DCI formats;

generating a HARQ-ACK codebook based on the first indication information and the second indication information in the plurality of DCI formats; and transmitting the HARQ-ACK codebook.

* * * * *